US012771103B2

(12) United States Patent
Ko et al.

(10) Patent No.: US 12,771,103 B2
(45) Date of Patent: Oct. 20, 2026

(54) SYSTEM AND METHOD TO ENABLE CABLE MOVEMENT

(71) Applicant: APEX USA Enterprise INC, Hutto, TX (US)

(72) Inventors: Hye Sun Ko, Round Rock, TX (US); Alex Ko, Round Rock, TX (US)

( * ) Notice: Subject to any disclaimer, the term of this patent is extended or adjusted under 35 U.S.C. 154(b) by 284 days.

(21) Appl. No.: 18/770,745

(22) Filed: Jul. 12, 2024

(65) Prior Publication Data

US 2026/0018870 A1 Jan. 15, 2026

(51) Int. Cl.
*H02G 1/06* (2006.01)

(52) U.S. Cl.
CPC .................................... *H02G 1/06* (2013.01)

(58) Field of Classification Search
CPC .... B65H 57/10; B65H 57/14; B65H 2701/36; H02G 1/08; H02G 1/06; H02G 1/04; H02G 1/085
USPC ................................. 254/134.3 R, 134.3 FT
See application file for complete search history.

(56) References Cited

U.S. PATENT DOCUMENTS 6,073,916 A 6/2000 Plummer
6,367,778 B1 4/2002 Mobley et al.
9,793,690 B2 10/2017 Jordan et al.
10,763,649 B2 * 9/2020 Dir ....................... H02G 3/0456
2011/0227012 A1 * 9/2011 Wang ....................... H02G 1/08 403/345
2015/0069107 A1 * 3/2015 Lu .......................... B65H 61/00 226/8
2022/0289513 A1 * 9/2022 Fiorentini ............ B65H 49/205

FOREIGN PATENT DOCUMENTS

EP 3603914 A1 2/2020
KR 102464354 B1 11/2022
KR 20230133563 A 9/2023

* cited by examiner

*Primary Examiner* — Jason L Vaughan
(74) *Attorney, Agent, or Firm* — Jeremy A. Briggs

(57) ABSTRACT

A cable movement system is disclosed. The system may include a first cable pulling device and a second cable pulling device configured to pull a cable disposed between the first cable pulling device and the second cable pulling device, and cause a cable movement on a predefined path. The system may further include a computing unit including a memory and a processor. The memory may be configured to store an information associated with predefined path geometry, and the processor may be configured to determine an optimal rotational speed for conveying wheels associated with the first and/or second cable pulling devices based on the information associated with predefined path geometry. The processor may be further configured to transmit a command signal to a motor associated with the first and/or second cable pulling devices to cause a conveying wheel rotation based on the optimal rotational speed.

20 Claims, 4 Drawing Sheets

SYSTEM AND METHOD TO ENABLE CABLE MOVEMENT

TECHNICAL FIELD

The present disclosure relates to a system and method to enable cable movement, and more particularly, to a system and method to enable cable movement via a plurality of cable pulling devices.

BACKGROUND

It is known that while laying cables (e.g., low-voltage, high-voltage and/or optical cables) in buildings or infrastructure such as tunnels, bridges, shipyards, etc., contractors are required to move the cables through large distances, and sometimes through narrow spaces (e.g., tubes) where human movement may be constrained. Conventionally, the contractors use a plurality of workers or manual labor to "pull" the cables through the building or infrastructure, and then lay the cables at the required installation location(s).

Since such cables are typically long and heavy, a large number of workers may be required to perform the cable pulling operation. Availability of large number of such workers may be limited, and hence the contractors may face inconvenience while laying the cables by using the conventional method. Further, when a large number of human workers pull the cable, chances of human error are high, which may result in damage(s) to the cable. Furthermore, when the cable is required to be moved through a narrow space, use of human workers to pull the cable may not work, as humans may not be able to easily enter and/or exit the narrow space.

Thus, a system and method is required that facilitates the contractors to conveniently and efficiently move cables.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
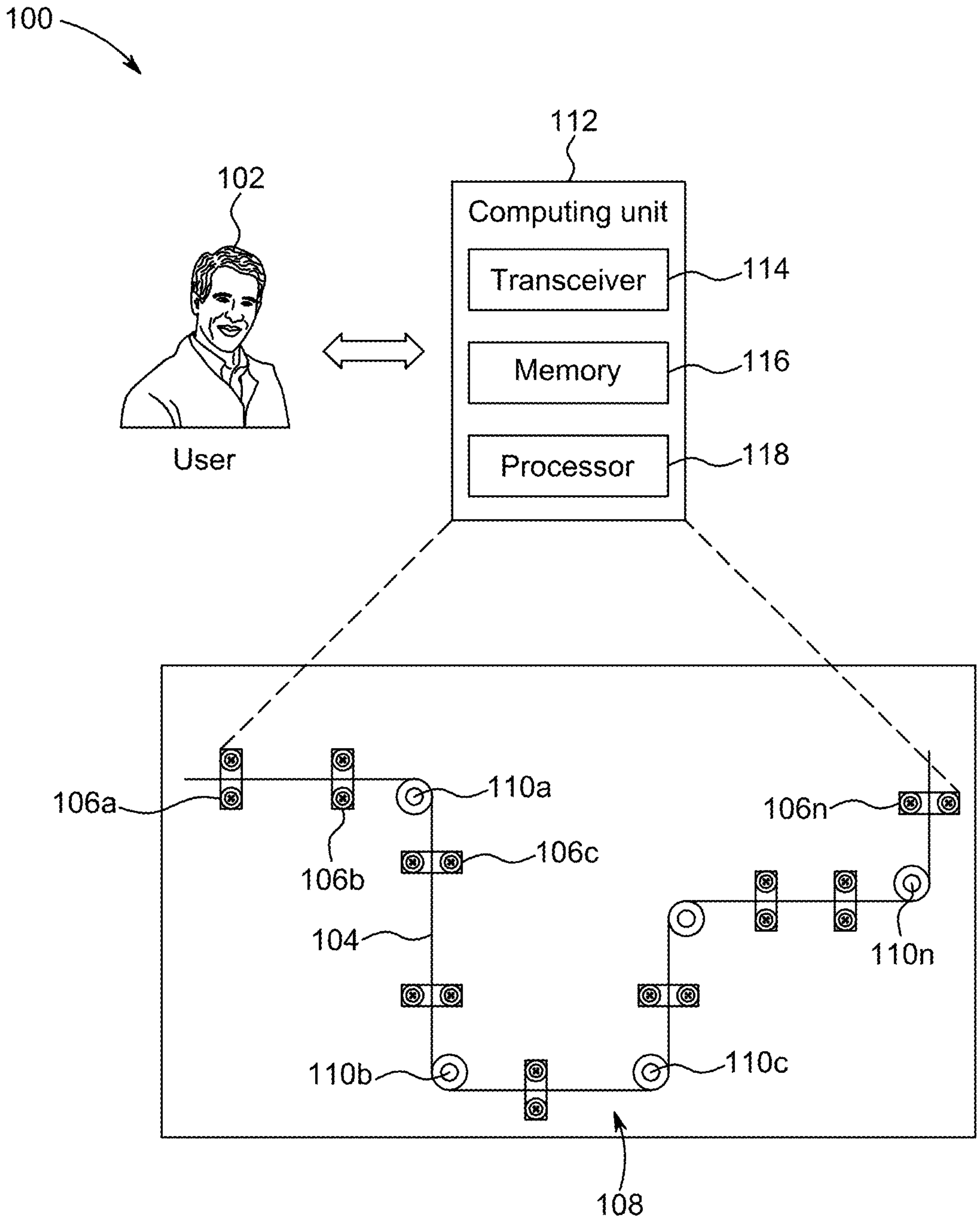
FIG. 1 depicts an example cable movement system for enabling a cable movement in accordance with the present disclosure.

The present disclosure describes a cable movement system that enables a user to conveniently move a cable in a building or an infrastructure. The system may include a plurality of cable pulling devices and pulleys that may enable cable movement along a predefined path in the building/infrastructure. Each cable pulling device may include a motor and two conveying wheels. The motor may be configured to rotate the conveying wheels at a same speed and in opposite directions. The cable may be inserted into a gap between the conveying wheels, and may be configured to be "pulled" by the rotating conveying wheels to cause the cable movement. The system may be configured to control the operation of each cable pulling device individually and simultaneously, so that the cable moves along the predefined path without experiencing any stress, strain and/or damage.

In some aspects, the system may be configured to obtain or determine information associated with a predefined path geometry, and may determine an optimal rotational speed for the conveying wheels based on the predefined path geometry. The information associated with the predefined path geometry may include information indicating a total predefined path length, a count of turns in the predefined path, an angle of cable movement at each turn, and/or the like. The system may determine the optimal rotational speed for the conveying wheels based on the predefined path geometry such that the cable moves along the predefined path efficiently, and do not slip or get stuck at any of the cable pulling devices and/or the turns.

In further aspects, the system may determine the optimal rotational speed for the conveying wheels based on cable information including, but not limited to, a cable length, a cable diameter, a cable weight, and/or the like. In additional aspects, the system may include one or more force measuring devices that may measure tension force in the cable, and one or more cameras that may capture cable images when the cable moves along the predefined path. The system may be configured to determine the optimal rotational speed for the conveying wheels based on the tension force acting on the cable, so that the cable is not stretched or compressed at any point along the predefined path. The system may be further configured to determine a "cable state" based on the cable images, and determine the optimal rotational speed for the conveying wheels based on the cable state. For example, the system may increase, decrease, or stop the rotational speed of the conveying wheels when the cable may be slipping at any cable pulling device along the predefined path, or may be getting torn or damaged.

In addition to determining and controlling the rotational speed for the conveying wheels, the system may be configured to determine and control a length of a gap between the conveying wheels, so that the cable effectively moves between the conveying wheels. As an example, the system may cause the gap length to increase if the cable has a large diameter, and the gap length to decrease if the cable has relatively shorter diameter.

In some aspects, the system may also control/adjust the rotational speed for the conveying wheels and/or the gap length based on user inputs.

The present disclosure discloses a cable movement system that enables a user to conveniently move large cables in a building or infrastructure. The system may autonomously move the cable, without requiring any manual labor or requiring minimal manual labor. Further, the system enables control of multiple cable pulling devices simultaneously, so that longer cables or cables with larger diameters (or heavy cables) can be effectively pulled/moved. The system further enables the user to control the speed of cable movement (e.g., by adjusting the rotational speed for the conveying wheels) at any time, thereby considerably enhancing user's convenience of performing the cable movement operation. Furthermore, since the system does not require workers to pull the cable, the system may enable the cable movement through narrow spaces (e.g., tubes), where humans may not enter or exit.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example cable movement system 100 (or system 100) for enabling a cable movement in accordance with the present disclosure. FIG. 1 will be described in conjunction with FIGS. 2 and 3.

The system 100 may be configured to enable a contractor or a user 102 to move a cable 104 through large distances and/or narrow spaces in a building or an infrastructure such as a tunnel, a bridge, a shipyard, etc. The system 100 may enable the user 102 to move the cable 104 without using manual labor or with the use of minimal manual labor. The system 100 may further enable the user 102 to move the cable 104 through any path or cable movement geometry. For example, the system 100 may cause the cable 104 to move vertically upwards against the force of gravity, vertically downwards, laterally left or right, and/or along a path that may be inclined at any angle relative to the ground surface. Furthermore, the system 100 may enable the cable 104 to take a plurality of turns (e.g., 45 degree turns, 90 degree turns, or turns at any other angle) along the cable movement path, without causing any damage to the cable 104 and/or requiring any additional manual labor.

In some aspects, the system 100 may include a plurality of cable pulling devices **106*a*, 106*b*, 106*c*, 106*n* (collectively referred to as cable pulling devices 106) that may be disposed/attached on walls, tubes, joints, etc. of the building/infrastructure along a predefined path 108 through which the cable 104 may be required to be moved. In some aspects, the predefined path 108 may be linear or straight. In other aspects, the predefined path 108 may not be linear, and may include a plurality of turns, and may involve upwards or downward cable movement, left or right movement, and/or the like. The cable pulling devices 106 may be configured to "pull" or move the cable 104 (or the section/portion of the cable 104) disposed between adjacent cable pulling devices. For example, the cable pulling device 106*a* (or a "first cable pulling device") and the cable pulling device 106*b* (or a "second cable pulling device") may be configured to pull or move the cable section disposed between the cable pulling devices 106*a* and 106*b*, and cause the cable movement along the predefined path 108. The cable pulling devices 106** may be oriented in different directions, based on the desired cable movement path/direction.

The system 100 may further include a plurality of pulleys **110*a*, 110*b*, 110*c*, 110*n* (collectively referred to as pulleys 110) that may enable the cable 104 to efficiently make one or more turns (e.g., 45 degree turns, 90 degree turns, or turns at any other angle) along the predefined path 108. Specifically, the pulleys 110 may enable the cable movement along the predefined path 108 (including the turns) between the cable pulling devices 106. For example, one or more pulleys 110 may enable the cable movement between the cable pulling device 106*c* and the cable pulling device 106*n*, or between the cable pulling device 106*a* and the cable pulling device 106*b*, and so on. In some aspects, one or more pulleys 110 may be attached/included at each turn along the predefined path 108**.

Figure 2:
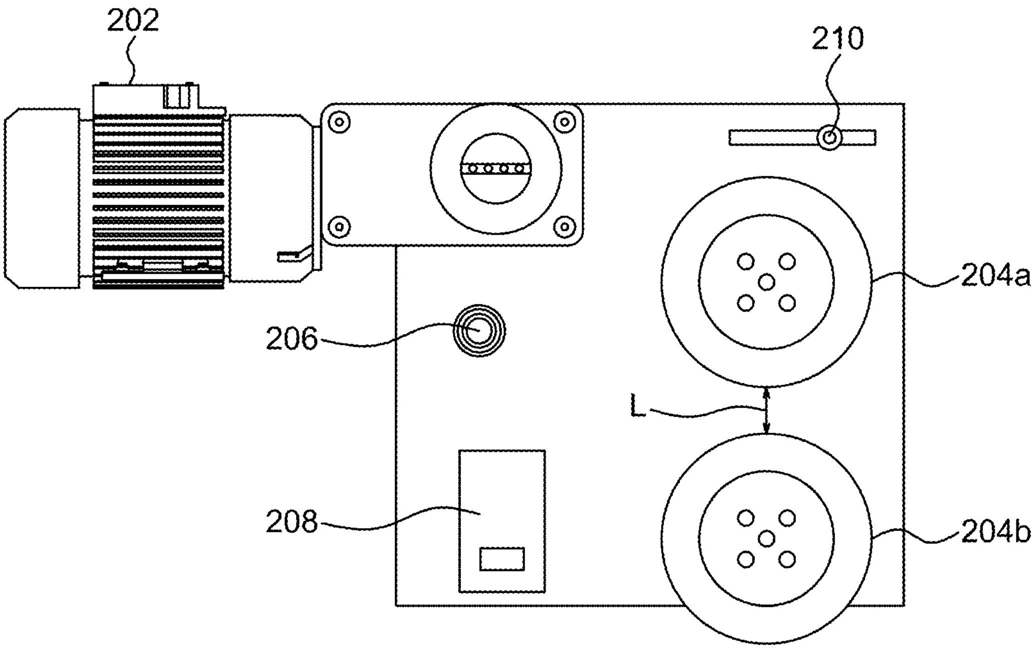
FIG. 2 depicts a first view of an example cable pulling device in accordance with the present disclosure.
Figure 3:
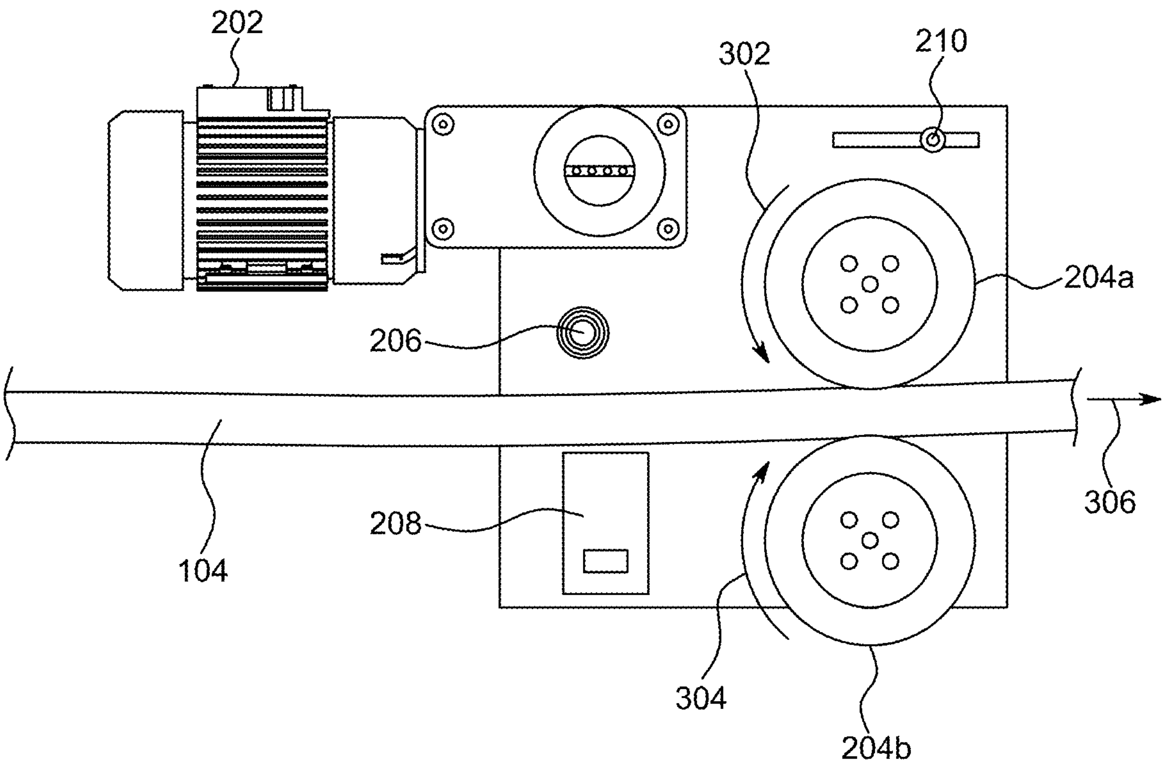
FIG. 3 depicts a second view of an example cable pulling device pulling a cable in accordance with the present disclosure.

In an exemplary aspect, each cable pulling device 106 may include a plurality of components/units including, but not limited to, a motor 202, two conveying wheels **204*a*, 204*b*, one or more cameras 206 (or a camera 206/"first camera"), one or more force measurement sensors 208 (or a force measurement sensor 208/"first force measurement sensor"), a wheel adjustment unit 210, and/or the like, as shown in FIGS. 2 and 3. In some aspects, each cable pulling device 106 may include all the components/units described above and shown in FIGS. 2 and 3. In other aspects, one or more cable pulling devices 106 may not include all the components/units, and may instead include a subset of the components/units described above. In some aspects, each cable pulling device 106 necessarily includes the motor 202 and the conveying wheels 204*a*, 204*b***.

The motor 202 may be configured to rotate the conveying wheels **204*a*, 204*b* at a same speed and in opposite directions. For example, the motor 202 may cause the conveying wheel 204*a* to rotate in a clockwise direction and the conveying wheel 204*b* to rotate in a counterclockwise direction (or vice versa), at a same speed. Each conveying wheel 204*a*, 204*b* may be of any diameter and/or thickness (based on the dimensions/weight of the cable required to be moved by the cable pulling device). Further, an exterior surface of each conveying wheel 204*a*, 204*b*** may be made of rubber or any other similar material that may be non-slippery (or rough).

In some aspects, the closest points on the exterior surfaces of the conveying wheels **204*a*, 204*b* may be disposed at a predefined length "L" away from each other (as shown in FIG. 2), thus forming a gap between the conveying wheels 204*a*, 204*b*. Stated another way, the gap between the conveying wheels 204*a*, 204*b* may have a length "L". In some aspects, the length "L" may be adjustable, e.g., based on a diameter of the cable 104 that may be required to be moved by the cable pulling device 106. The wheel adjustment unit 210 may be configured to adjust (i.e., increase or decrease) the length "L" associated with the gap between the conveying wheels 204*a*, 204*b*. The cable 104 may get inserted into the gap between the conveying wheels 204*a*, 204*b* (i.e., into the length "L"), and may be configured to be "pulled" by the rotating conveying wheels 204*a*, 204*b* to cause the cable movement, as shown by arrows 302, 304 and 306 in FIG. 3**.

The camera 206 may be configured to capture one or more cable images when the cables 104 moves between the conveying wheels **204*a*, 204*b*. Further, the force measurement sensor 208 may be configured to measure tension force in the cable 104 (e.g., lateral and/or longitudinal forces acting on the cable 104) when the cable 104 moves between the conveying wheels 204*a*, 204*b*. The longitudinal forces may be acting on the cable 104 in a linear direction or along a cable's longitudinal axis, and the lateral forces may be acting on the cable 104 along a cable's lateral axis (e.g., due to the "squeeze" of the adjacent conveying wheels 204*a*, 204*b*** on the cable surface along the length "L").

In some aspects, the force measurement sensor 208 may be configured to measure the tension force in the cable 104 based on cable's incoming feed rate and/or outgoing feed rate to/from the cable pulling device 106, and the rotational speed associated with the conveying wheels **204*a*, 204*b*. In some aspects, a substantial difference between the feed rate and the rotational speed may indicate less or high tension force in the cable 104. A less or high tension force in the cable 104 may indicate that the cable 104 may be stretched, compressed or strained, when the cable 104 moves through the conveying wheels 204***a*, 204*b*. In other aspects, the force measurement sensor 208 may determine the tension force in the cable 104 by using any other known methods of measuring force in the cable 104.

Although the description above describes an aspect where the force measurement sensor 208 and the camera 206 are disposed on the cable pulling device 106, the present disclosure is not limited to such an aspect. In additional or alternative aspects, one or more force measurement sensors and/or cameras may be disposed on different locations in the building or the infrastructure. In further aspects, one or more additional force measurement sensors (e.g., a "second force measurement sensor") and/or one or more additional cameras (e.g., a "second camera") may be disposed on one or more pulleys 110. Similar to the force measurement sensor 208, the second force measurement sensor may also be configured to measure the tension force in the cable 104 when the cable 104 moves through the cable pulling devices 106 on the predefined path 108. Further, similar to the camera 206, the second camera may also be configured to capture one or more cable images when the cable 104 moves through the cable pulling devices 106 on the predefined path 108.

In addition to the cable pulling devices 106 and the pulleys 110, the system 100 may further include a computing unit 112 that may be communicatively coupled with each cable pulling device 106 via a wired connection or a wireless network. The wireless network, as described herein, may be, for example, a communication infrastructure in which the connected devices discussed in various embodiments of this disclosure may communicate. The wireless network may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The computing unit 112 may be in the form of a computer, a laptop, a mobile phone, a smartwatch, a distributed computing system, a server, and/or the like. In some aspects, the user 102 may control the operation of each cable pulling device 106 simultaneously via the computing unit 112. Stated another way, the computing unit 112 may be configured to control the operation of each cable pulling device 106 simultaneously based on command signals or inputs obtained from the user 102. In other aspects, the computing unit 112 may autonomously control the operation of each cable pulling device 106 simultaneously, such that the cable 104 is effectively moved on the predefined path 108.

The computing unit 112 may include a plurality of components/units including, but not limited to, a transceiver 114, a memory 116, a processor 118, and/or the like. The transceiver 114 may be configured to transmit/receive signals/information/data to/from external devices, e.g., a user device associated with the user 102, the cable pulling devices 106, etc., via the wired connection or the wireless network described above. The memory 116 may store programs in code and/or store data for performing various system operations in accordance with the present disclosure. Specifically, the processor 118 may be configured and/or programmed to execute computer-executable instructions stored in the memory 116 for performing various system functions in accordance with the disclosure. Consequently, the memory 116 may be used for storing code and/or data code and/or data for performing operations in accordance with the present disclosure.

In one or more aspects, the processor 118 may be in communication with one or more memory devices (e.g., the memory 116 and/or one or more external databases (not shown in FIG. 1). The memory 116 may include any one or a combination of volatile memory elements (e.g., dynamic random-access memory (DRAM), synchronous dynamic random access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The memory 116 may be one example of a non-transitory computer-readable medium and may be used to store programs in code and/or to store data for performing various operations in accordance with the present disclosure. The instructions in the memory 116 may include one or more separate programs, each of which may include an ordered listing of computer-executable instructions for implementing logical functions.

In some aspects, the memory 116 may store an information associated with a geometry of the predefined path 108 (or "predefined path geometry"). The information associated with predefined path geometry may include information about a predefined path's total length, a count of turns in the predefined path 108, location of each turn in the predefined path 108, an angle of inclination relative to the ground surface for each section/portion of the predefined path 108 between adjacent turns, an angle of the cable movement at each turn in the predefined path 108 (e.g., whether the cable 104 would turn by 30 degrees, 45 degrees, 60 degrees, 90 degrees, etc. at each turn), and/or the like. In some aspects, the computing unit 112 may receive the information associated with predefined path geometry from the user 102. Stated another way, the user 102 may provide the information associated with predefined path geometry to the computing unit 112, which may get stored in the memory 116. In other aspects, the processor 118 may be configured to itself determine some parts of or all the information associated with predefined path geometry based on images (e.g., cable images) obtained from the cameras 206 disposed on the cable pulling devices 106 and/or the second cameras disposed on the pulleys 110 or other locations in the building/infrastructure.

During system 100 operation, the processor 118 may obtain (or itself determine) the information associated with predefined path geometry from the memory 116. The processor 118 may then determine an optimal rotational speed for the conveying wheels 204*a*, 204*b* of each cable pulling device 106 based on the information associated with predefined path geometry, the location of each cable pulling device 106 in the predefined path 108, and/or a state of the conveying wheels 204*a*, 204*b*. The processor 118 may determine the optimal rotational speed for the conveying wheels 204*a*, 204*b* of each cable pulling device 106 such that the cable 104 is not stretched or strained when the cable 104 moves between each cable pulling device 106. Further, the processor 118 may determine the optimal rotational speed such that the cable's incoming feed rate and outgoing feed rate to/from each cable pulling device 106 may be same, and the cable 104 efficiently moves at a steady rate along the predefined path 108.

In some aspects, the processor 118 may determine the optimal rotational speed for the conveying wheels 204*a*, 204*b* of each cable pulling device 106 based on the predefined path's total length, the count of turns in the predefined path 108, an angle of cable movement at each turn in the predefined path 108, and/or the like, which may be part of the information associated with predefined path geometry. For example, the processor 118 may determine a greater optimal rotational speed when the predefined path 108 has a large count of turns (e.g., more than 6-8 turns), and/or when the angle of cable movement at one or more turns in the predefined path 108 may be more than 60 degrees or close to 90 degrees. As another example, the processor 118 may determine a greater optimal rotational speed when the predefined path 108 may be long.

In further aspects, the processor 118 may determine different optimal rotational speeds for different cable pulling devices 106, based on the location of each cable pulling device 106 in the predefined path 108 and/or the state of the conveying wheels 204*a*, 204*b*. In an exemplary aspect, the processor 118 may determine different optimal rotational speeds for different cable pulling devices 106 based on local conditions at each cable pulling device, e.g., wheel's wear and tear or wheel condition, presence of grease on one or more wheels, required inclination angle of cable movement in proximity to the cable pulling device (e.g., whether the cable 104 is required to be moved vertically upwards against the force of gravity, or downwards, or laterally), and/or the like.

Responsive to determining the optimal rotational speed for the conveying wheels 204*a*, 204*b* of each cable pulling device 106 as described above, the processor 118 may transmit, via the transceiver 114, a command signal (e.g., a "first command signal") to the motor 202 of each cable pulling device 106 to cause a conveying wheel rotation based on the optimal rotational speed. When the motor 202 receives the command signal from the processor 118, the motor 202 may cause the conveying wheels 204*a*, 204*b* to rotate at the optimal rotational speed determined by the processor 118. Since the processor 118 determines the optimal rotational speed for each cable pulling device 106 separately and differently based on local conditions at each cable pulling device 106, the processor 118 is able to control operation of each cable pulling device 106 differently (and individually). Further, since the processor 118 determines the optimal rotational speed for each cable pulling device 106 such that the cable 104 is not stretched or strained when the cable 104 moves between each cable pulling device 106, the processor 118 ensures that the cable 104 effectively moves along the predefined path 108 without enduring any damage caused to stress or strain.

Although the description above describes an aspect where the processor 118 determines the optimal rotational speed based on the information associated with predefined path geometry, the location of each cable pulling device 106 in the predefined path 108, and/or the state of the conveying wheels 204*a*, 204*b*, the present disclosure is not limited to such an aspect. In additional or alternative aspects, the processor 118 may determine the optimal rotational speed based on one or more additional parameters, which are described below.

In an exemplary aspect, the processor 118 may obtain or determine cable information associated with the cable 104, and may determine the optimal rotational speed based on the cable information. The cable information may include information associated with a cable length, a cable diameter, a cable weight, and/or the like. As an example, the processor 118 may determine a greater optimal rotational speed for the conveying wheels 204*a*, 204*b* when the cable 104 may be long and/or heavy, and may be required to be moved along an inclined path.

In some aspects, the processor 118 may obtain the cable information from the user 102. In other aspects, the processor 118 may itself determine parts of or entire cable information based on images obtained from the cameras 206 and/or the second cameras disposed on the pulleys 110. In this case, the processor 118 may determine the cable length and diameter from the obtained images, and may estimate the cable weight based on the determined cable length/diameter and a known cable material density (that may be provided by the user 102, or may be pre-stored in the memory 116 or determined by the processor 118 based on density data associated with a plurality of cables stored in the memory 116).

In another exemplary aspect, the processor 118 may determine a tension force acting on the cable 104 and/or a cable state when the cable 104 moves through the cable pulling devices 106 in the predefined path 108, and may determine the optimal rotational speed or adjust an already-identified optimal rotational speed for the conveying wheels 204*a*, 204*b* based on the tension force and/or the cable state. In some aspects, the processor 118 may determine the cable state based on the cable images obtained from the cameras 206 disposed on the cable pulling devices 106 and/or the second cameras disposed on the pulleys 110 or other locations in the building/infrastructure. The cable state may indicate whether the cable 104 is stretched or compressed at any point in the predefined path 108, whether the cable 104 is getting damaged or stuck at any point, whether the cable 104 is slipping at any cable pulling device (e.g., slipping between the conveying wheels associated with any cable pulling device), and/or the like. Responsive to determining the cable state, the processor 118 may determine the optimal rotational speed or cause an adjustment of the optimal rotational speed (e.g., increase or decrease rotational speed associated with one or more "affected" cable pulling devices by transmitting a signal to the motor 202) such that the cable 104 effectively moves along the predefined path 108, without any stretching, compression and/or damage.

In some aspects, the processor 118 may determine the tension force in the cable 104 based on inputs obtained from the force measurement sensors 208 and/or second force measurement sensors disposed on the pulleys 110. In other aspects, the processor 118 may determine the tension force based on the cable images obtained from the cameras 206 and/or the second cameras disposed on the pulleys 110 or other locations in the building/infrastructure. For example, the processor 118 may determine that the cable 104 may be experiencing a high tension force when the cable 104 may be stretched (or compressed), determined based on the cable images. As another example, the processor 118 may determine that the cable 104 may be experiencing a high tension force when a cable's incoming feed rate at one or more cable pulling devices may be more or less than the cable's outgoing feed rate, determined based on the cable images.

Responsive to determining the tension force in the cable 104 as described above, the processor 118 may determine an optimal tension force in the cable 104 such that the cable 104 is not strained or stretched. In some aspects, the processor 118 may determine the optimal tension force based on the information associated with predefined path geometry and pre-stored historical/training data including a mapping of a plurality of path geometries with optimal tension forces (that may be stored in the memory 116). In other aspects, the processor 118 may determine the optimal tension force in the cable 104 by analyzing the cable images, and identifying the optimal tension force at which the cable 104 is not strained or stretched (as determined based on the cable image analysis).

Responsive to determining the optimal tension force, the processor 118 may compare the determined tension force in the cable 104 with the optimal tension force. The processor 118 may further check whether a difference between the determined tension force and the optimal tension force is non-zero (or greater than a predefined threshold). Responsive to determining that the difference is non-zero or greater than the predefined threshold, the processor 118 may determine the optimal rotational speed or an adjusted optimal rotational speed for the conveying wheels 204*a*, 204*b* based on the difference. Specifically, the processor 118 may determine the optimal rotational speed or the adjusted optimal rotational speed such that the difference becomes zero (or close to zero). Responsive to determining the adjusted optimal rotational speed, the processor 118 may cause adjustment of the rotational speed of the conveying wheels 204*a*, 204*b* (via the motor 202) such that the conveying wheels 204*a*, 204*b* rotate at the adjusted optimal rotational speed.

In this manner, the processor 118 may control operation or rotational speeds associated with each cable pulling device 106, such that the cable 104 moves optimally in the predefined path 108. Further, since the processor 118 autonomously identifies the tension force and/or the cable state, and adjusts the rotational speed associated with the conveying wheels 204*a*, 204*b*, the system 100 does not require manual intervention or requires minimal manual intervention to enable effective cable movement along with the predefined path 108.

In additional aspects, when one or more users, workers or external devices may be pulling the cable 104 (in addition to the cable pulling devices 106 pulling or moving the cable 104 along the predefined path 108), the processor 118 may be configured to determine that such workers/devices may be pulling the cable 104 based on images obtained from the cameras 206 and/or the second cameras installed on the pulleys 110. Responsive to determining that the workers/devices may be pulling the cable 104, the processor 118 may determine a count of users or devices that may be pulling the cable 104 based on the obtained images. The processor 118 may further estimate an external pulling force that may be acting on the cable 104 based on the determined count. The processor 118 may then determine an "adjusted" optimal tension force in the cable 104 based on the external pulling force. Specifically, in this case, the processor 118 may subtract the external pulling force from the optimal tension force described above, to calculate the adjusted optimal tension force or to compensate for the worker/device's pull on the cable 104. The processor 118 may then determine the optimal rotational speed for the conveying wheels 204*a*, 204*b* such that the tension force in the cable 104 becomes equivalent to the adjusted optimal tension force, and cause the conveying wheels 204*a*, 204*b* to rotate at the optimal rotational speed, as described above.

In some aspects, the processor 118 may also determine the optimal rotational speed or adjust the rotational speed associated with the conveying wheels 204*a*, 204*b* based on user inputs or commands provided by the user 102. For example, the processor 118 may increase the rotational speed when the user 102 commands to move the cable 104 at a faster rate, and may reduce the rotational speed when the user 102 commands to move the cable 104 slowly. The user 102 may also view the real-time camera feed from the cameras 206 and/or the second cameras disposed on the pulleys 110, and may command increase, decrease or stoppage of the rotation of the conveying wheels 204*a*, 204*b* by analyzing the camera feed (e.g., when the cable 104 may be slipping or getting torn at any point in the predefined path 108).

Although the description above describes an aspect where the processor 118 determines and causes to adjust the rotational speed associated with the conveying wheels 204*a*, 204*b* based on one or more parameters, the present disclosure is not limited to such an aspect. In additional or alternative aspects, the processor 118 may also cause, via the wheel adjustment unit 210, adjustment of the length "L" associated with the gap between the adjacent conveying wheels 204*a*, 204*b* based on the parameters described above.

For example, the processor 118 may determine an optimal length associated with the gap between the adjacent conveying wheels 204*a*, 204*b* based on the cable information (i.e., the cable length, diameter, weight, etc.) and/or the information associated with predefined path geometry, and transmit a command signal (e.g., a "second command signal") to the wheel adjustment unit 210 to adjust the length "L" based on the determined optimal length. As an example, the processor 118 may determine a larger length "L" when the cable diameter may be large, and may determine a shorter length "L" when the cable diameter may be small.

In another exemplary aspect, the processor 118 may determine the optimal length based on the difference between the determined tension force in the cable 104 and the optimal tension force. Specifically, in this case, the processor 118 may determine the optimal length such that the difference becomes equivalent to zero. In yet another exemplary aspect, the processor 118 may determine the optimal length based on the cable state determined via the cable images. For example, if the processor 118 determines that the cable 104 may be slipping or not moving laterally between the conveying wheels 204*a*, 204*b*, the processor 118 may determine a "shorter" optimal length so that cable 104 effectively moves (and does not slip), and may cause the wheel adjustment unit 210 to adjust the length "L" to become equivalent to the "shorter" optimal length.

The processor 118 may perform one or more additional actions to enable efficient cable movement along the predefined path 108. For example, if the processor 118 determines that the cable 104 may be slipping or not moving laterally between the conveying wheels 204*a*, 204*b*, the processor 118 may transmit, via the transceiver 114, a recommendation to the user device associated with the user 102 indicating that the user 102 should install one or more additional cable pulling devices in front of the cable pulling device experiencing the cable slippage, to enable efficient cable movement and distribution of cable load. The processor 118 may further determine the optimal length associated with the gap between the adjacent conveying wheels 204*a*, 204*b* such that both cable surfaces touching the conveying wheels 204*a*, 204*b* experience the same force.

In further aspects, the processor 118 may be an Artificial Intelligence/Machine Learning (AI/ML) based processor that may be configured to suggest or recommend an optimal manner of enabling cable movement in the predefined path 108. In this case, the memory 116 may store a database of historical pull forces, counts and/or locations of a plurality of cable pulling devices, pulleys, etc. correlated with a plurality of cable movement paths. When the user 102 desires to cause cable movement of a cable, the processor 118 may first obtain the information associated with predefined path geometry from the user 102. The processor 118 may then use the database described above to suggest or recommend to the user 102 an optimal count of cable pulling devices, pulleys, etc. that the user 102 may install along the predefined path and their corresponding locations, so that the cable may be effectively moved along the predefined path. In this manner, the processor 118 may provide useful recommendation to the user 102, when the user 102 may be planning the system 100 installation in a building or an infrastructure.

Figure 4:
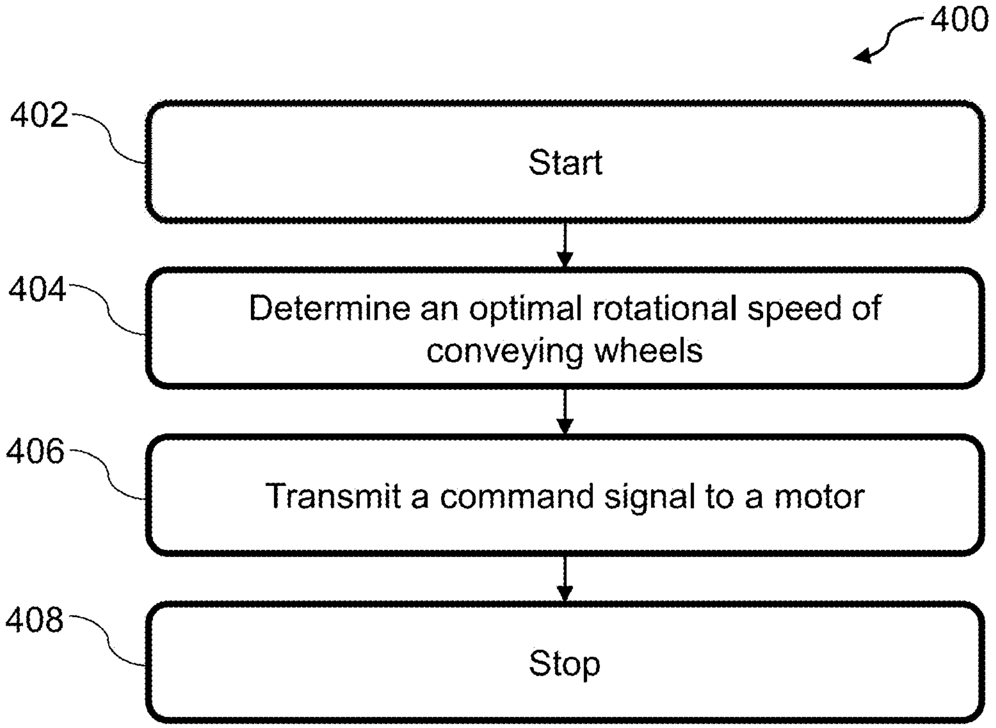
FIG. 4 depicts a flow diagram of an example method for enabling a cable movement in accordance with the present disclosure.

FIG. 4 depicts a flow diagram of an example method 400 for enabling a cable movement in accordance with the present disclosure. FIG. 4 may be described with continued reference to prior figures, including FIGS. 1-3. The following process is exemplary and not confined to the steps described hereafter. Moreover, alternative embodiments may include more or less steps than are shown or described herein and may include these steps in a different order than the order described in the following example embodiments.

Referring to FIG. 4, at step 402, the method 400 may commence. At step 404, the method 400 may include determining, by the processor 118, the optimal rotational speed for the conveying wheels 204*a*, 204*b* based on the information associated with predefined path geometry, as described above. At step 406, the method 400 may include transmitting, by the processor 118, a command signal to the motor 202 to cause the conveying wheels 204*a*, 204*b* to rotate at the optimal rotational speed.

At step 408, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A cable movement system comprising:

a first cable pulling device and a second cable pulling device configured to pull a cable disposed between the first cable pulling device and the second cable pulling device, and cause a cable movement on a predefined path, wherein each of the first cable pulling device and the second cable pulling device comprises:

a motor and two conveying wheels, wherein:

the motor is configured to rotate the conveying wheels at a same speed and in opposite directions, and the cable gets inserted into a gap between the conveying wheels and is configured to be pulled by the conveying wheels to cause the cable movement; and a computing unit comprising a memory and a processor, wherein:

the memory is configured to store an information associated with predefined path geometry; and the processor is configured to:

determine an optimal rotational speed of the conveying wheels based on the information associated with predefined path geometry; and transmit a first command signal to the motor to cause a conveying wheel rotation based on the optimal rotational speed.

2. The cable movement system of claim 1, wherein the information associated with predefined path geometry comprises an information associated with a count of turns in the predefined path.

3. The cable movement system of claim 2, wherein the information associated with predefined path geometry further comprises an information associated with an angle of the cable movement at each turn in the predefined path.

4. The cable movement system of claim 1, wherein the processor is further configured to:

determine a cable information, wherein the cable information comprises at least one of a cable length, a cable diameter or a cable weight; and determine the optimal rotational speed based on the cable information.

5. The cable movement system of claim 4, wherein each of the first cable pulling device and the second cable pulling device further comprises a wheel adjustment unit configured to adjust a length of the gap between the conveying wheels.

6. The cable movement system of claim 5, wherein the processor is further configured to:

determine an optimal length associated with the gap based on at least one of the cable information or the information associated with predefined path geometry; and transmit a second command signal to the wheel adjustment unit to adjust the gap based on the optimal length.

7. The cable movement system of claim 1, wherein the processor is further configured to:

determine at least one of a tension force acting on the cable or a cable state when the cable moves between the first cable pulling device and the second cable pulling device; and cause an adjustment of at least one of the optimal rotational speed or a length of the gap between the conveying wheels based on the tension force or the cable state.

8. The cable movement system of claim 7, wherein the processor is further configured to:

determine an optimal tension force in the cable such that the cable is not strained or stretched;

compare the optimal tension force with the determined tension force;

determine that a difference between the optimal tension force and the determined tension force is non-zero;

determine an adjusted optimal rotational speed or an optimal length of the gap between the conveying wheels based on the difference; and cause the adjustment of at least one of the optimal rotational speed or the length of the gap between the conveying wheels based on the adjusted optimal rotational speed or the optimal length.

9. The cable movement system of claim 7 further comprising at least one of:

one or more first force measurement sensors disposed on at least one of the first cable pulling device or the second cable pulling device, wherein the one or more first force measurement sensors are configured to measure the tension force; or one or more first cameras disposed on at least one of the first cable pulling device or the second cable pulling device, wherein the one or more first cameras are configured to capture a cable image when the cable moves between the first cable pulling device and the second cable pulling device.

10. The cable movement system of claim 9, wherein the processor determines the tension force based on inputs obtained from the one or more first force measurement sensors, and wherein the processor determines the cable state based on the cable image.

11. The cable movement system of claim 8, wherein the processor is further configured to:

determine that one or more users or one or more external devices are pulling the cable;

estimate an external pulling force acting on the cable when the one or more users or the one or more external devices pull the cable; and determine the optimal tension force based on the external pulling force.

12. The cable movement system of claim 11, wherein the processor is further configured to:

determine a count of the one or more users or the one or more external devices pulling the cable; and estimate the external pulling force based on the count.

13. The cable movement system of claim 1 further comprising one or more pulleys configured to enable the cable movement in the predefined path between the first cable pulling device and the second cable pulling device.

14. The cable movement system of claim 13, wherein the one or more pulleys comprise at least one of a second force measurement sensor or a second camera, wherein the second force measurement sensor is configured to measure a tension force acting on the cable, and wherein the second camera is configured to capture a cable image when the cable moves between the first cable pulling device and the second cable pulling device.

15. The cable movement system of claim 1, wherein the processor is further configured to determine the optimal rotational speed based on user inputs.

16. A method to enable a cable movement, the method comprising:

determining, by a processor, an optimal rotational speed of two conveying wheels based on an information associated with predefined path geometry, wherein:

the conveying wheels are part of each of a first cable pulling device and a second cable pulling device, the first cable pulling device and the second cable pulling device are configured to pull a cable disposed between the first cable pulling device and the second cable pulling device, and cause the cable movement on a predefined path, each of the first cable pulling device and the second cable pulling device further comprises a motor, the motor is configured to rotate the conveying wheels at a same speed and in opposite directions, and the cable gets inserted into a gap between the conveying wheels and is configured to be pulled by the conveying wheels to cause the cable movement; and transmitting, by the processor, a command signal to the motor to cause a conveying wheel rotation based on the optimal rotational speed.

17. The method of claim 16, wherein the information associated with predefined path geometry comprises an information associated with a count of turns in the predefined path.

18. The method of claim 17, wherein the information associated with predefined path geometry further comprises an information associated with an angle of the cable movement at each turn in the predefined path.

19. The method of claim 16 further comprising:

determining a cable information, wherein the cable information comprises at least one of a cable length, a cable diameter or a cable weight; and determining the optimal rotational speed based on the cable information.

20. A non-transitory computer-readable storage medium having instructions stored thereupon which, when executed by a processor, cause the processor to:

determine an optimal rotational speed of two conveying wheels based on an information associated with predefined path geometry, wherein:

the conveying wheels are part of each of a first cable pulling device and a second cable pulling device, the first cable pulling device and the second cable pulling device are configured to pull a cable disposed between the first cable pulling device and the second cable pulling device, and cause a cable movement on a predefined path, each of the first cable pulling device and the second cable pulling device further comprises a motor, the motor is configured to rotate the conveying wheels at a same speed and in opposite directions, and the cable gets inserted into a gap between the conveying wheels and is configured to be pulled by the conveying wheels to cause the cable movement; and transmit a command signal to the motor to cause a conveying wheel rotation based on the optimal rotational speed.

* * * * *